(12) United States Patent
Baudhuin et al.

(10) Patent No.: US 7,849,636 B2
(45) Date of Patent: Dec. 14, 2010

(54) FOAM DISTRIBUTION PARTS WITH INTEGRAL MEMBRANE FASTENING STRUCTURES

(75) Inventors: Michel Baudhuin, Morin Heights (CA); Joey Villeneuve, Brossard (CA); Martin Desaulniers, Bois des Fillions (CA)

(73) Assignee: Sunarc of Canada Inc., Montreal, Quebec (CA)

( * ) Notice: Subject to any disclaimer, the term of this patent is extended or adjusted under 35 U.S.C. 154(b) by 510 days.

(21) Appl. No.: 11/833,562

(22) Filed: Aug. 3, 2007

(65) Prior Publication Data
US 2008/0028698 A1 Feb. 7, 2008

(51) Int. Cl.
*E04D 13/00* (2006.01)

(52) U.S. Cl. ................. 52/13; 52/11; 52/171.3

(58) Field of Classification Search ............ 52/2.15, 52/171.3, 11, 13, 408, 409, DIG. 17, 746.11, 52/742.13, 309.4, 66, 222; 126/53; 165/136; 264/51
See application file for complete search history.

(56) References Cited

U.S. PATENT DOCUMENTS

| 2,986,150 | A | * | 5/1961 | Torian | 52/63 |
| 4,468,899 | A | * | 9/1984 | Miller | 52/58 |
| 4,841,688 | A | * | 6/1989 | Rinaldi | 52/63 |
| 5,065,562 | A | * | 11/1991 | Larsen et al. | 52/772 |
| 5,138,820 | A | * | 8/1992 | Pearce et al. | 52/656.1 |
| 2007/0069411 | A1 | * | 3/2007 | Amar et al. | 264/51 |

FOREIGN PATENT DOCUMENTS

GB  2259313 A * 3/1993

* cited by examiner

*Primary Examiner*—Brian E Glessner
*Assistant Examiner*—Patrick Maestri
(74) *Attorney, Agent, or Firm*—Ogilvy Renault LLP

(57) ABSTRACT

A gutter and sheeting material holding device comprises an elongated body having a bottom wall, and side walls extending from opposed sides of the bottom wall. The bottom and side walls define a gutter for channeling a liquid. Sheet holding channels are provided at a distal end of the side walls. Wedges are inserted into the sheet holding channels for anchoring sheets or membranes to the side walls of the gutter.

3 Claims, 4 Drawing Sheets

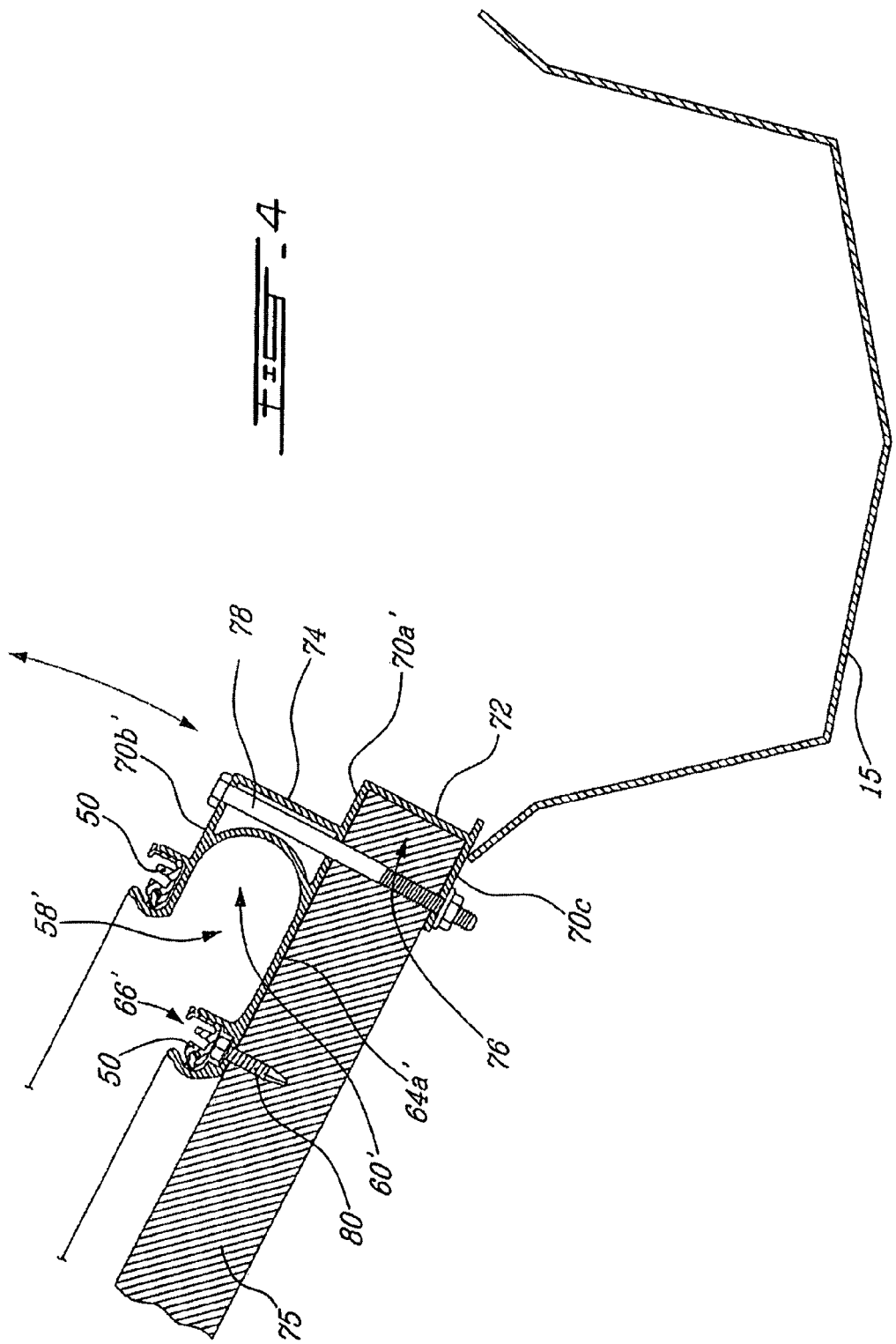

FOAM DISTRIBUTION PARTS WITH INTEGRAL MEMBRANE FASTENING STRUCTURES

FIELD OF THE INVENTION

The present invention relates generally to a system and a method for periodically insulating and/or shading a body, such as a building structure, and more particularly to foam distribution parts having integrated membrane fastening structures.

DESCRIPTION OF THE PRIOR ART

Building structures having cavities formed between double light transmitting or other opaque or plastic roof or wall membranes for receiving degradable or replaceable foam insulation are known. The roof and wall cavities can be periodically filled with degradable foam to provide shading or thermal insulation. However, when it is desired to let the light pass through the building envelope in order to take advantage of the solar energy, the foam can be readily dissolved and removed from the cavities. Examples of such buildings can be found in U.S. Pat. Nos. 3,672,184 and 4,562,674.

The inner and outer membranes are typically united to each other along their bottom ends so as to define a bottom slope for the purpose of channeling the liquid resulting from the foam degradation to a main liquid tank. The use of the bottom portion of the membranes as a gutter poses several problems, such as 1) the efficient drainage along very long structures having a small slope; 2) the quick removal of the excess liquid draining from the foam or the spray nozzles used for both light shading or washing of the membrane; 3) without a proper gutter, any interference along the drain path can cause an excess accumulation of liquid causing potential stress, bellowing or deforming of the membrane; 4) in winter's cold temperatures, residue of liquid can freeze rupturing the membranes and cause leaks; and 5) the accumulation of dust, bugs and other matter in corners, unequal tightening of membranes. The suction effect at the outlet also tends to close the membranes one against the other, thereby inhibiting the flow of liquid.

Accordingly, there is a need for a new double-walled cavity gutter arrangement.

Furthermore, the fixing of the membranes to the greenhouse skeleton framework has heretofore required the use of several external fastening pieces which contributes to increase the installation time and costs. There is a thus need for an integrated foam distribution and sheet anchoring system.

SUMMARY OF THE INVENTION

Therefore, in accordance with an aspect of the present invention, there is provided a periodically shieldable solar structure comprising an inner membrane and an outer membrane defining therebetween an internal cavity, a foam generating system for selectively filling said internal cavity with degradable foam, said inner and outer membranes being united along a lower end thereof by a gutter interposed between the inner and outer membranes and defining a top open-ended channel for receiving and channeling the liquid resulting from foam degradation and/or from a liquid spraying system, the gutter having a mounting flange for allowing the gutter to be mounted to a framework of the shieldable solar structure, the gutter further having first and second side walls provided with respective sheet holding means for respectively fixedly anchoring said inner and outer membranes to said first and second side walls of said gutter.

In accordance with an another aspect of the present invention, there is provided a building structure comprising a double-walled insulation space having a bottom formed by a channel-shaped extrusion interposed between an inner membrane and an outer membrane, the channel-shaped extrusion having a bottom surface and first and second longitudinal side walls extending from said bottom surface, said inner and outer membranes being respectively fixed to said first and second longitudinal side walls.

In accordance with a further aspect of the present invention, there is provided a fastening device for fixing first and second membranes to a framework, comprising a main member adapted to be mounted to the framework, said main member having first and second arms interconnected by a bottom web, said bottom web and said first and second arms forming a gutter, said first and second arms being respectively provided with first and second sheet keeper receiving channels at respective distal end portions thereof relative to said bottom web, said first and second sheet keeper receiving channels being adapted to respectively receive first and second sheet keepers in locking engagement therewithin in order to respectively fixedly hold one end of the first and second membranes in said first and second sheet keeper receiving channels such that the gutter extends between the membranes.

In accordance with a still further general aspect of the present invention, there is provided a gutter and sheeting material holding device combination comprising an elongated body having a bottom wall, and first and second side walls extending from opposed sides of said bottom wall and defining therewith a channel for channeling a liquid, first and second sheet holding channels respectively provided at a distal end of said first and second side walls, and first and second mating wedges respectively insertable into said first and second sheet holding channels for anchoring first and second sheets to said first and second side walls.

In accordance with a still further general aspect of the present invention, there is provided a pipe extrusion comprising an elongated wall structure having a closed cross-section defining a longitudinal passage for channeling a fluid, and first and second longitudinal channels provided on an outer side of said wall structure for respectively receiving membrane wedging inserts in locking engagement therewithin.

BRIEF DESCRIPTION OF THE DRAWINGS

Reference will now be made to the accompanying drawings, showing by way of illustration a preferred embodiment thereof, and in which:

FIG. 4 is a cross-sectional view of a gutter assembly with double membrane fastening devices suited for openable roof sections in accordance with a further embodiment of the present invention.

DESCRIPTION OF THE PREFERRED EMBODIMENTS

Figure 1:
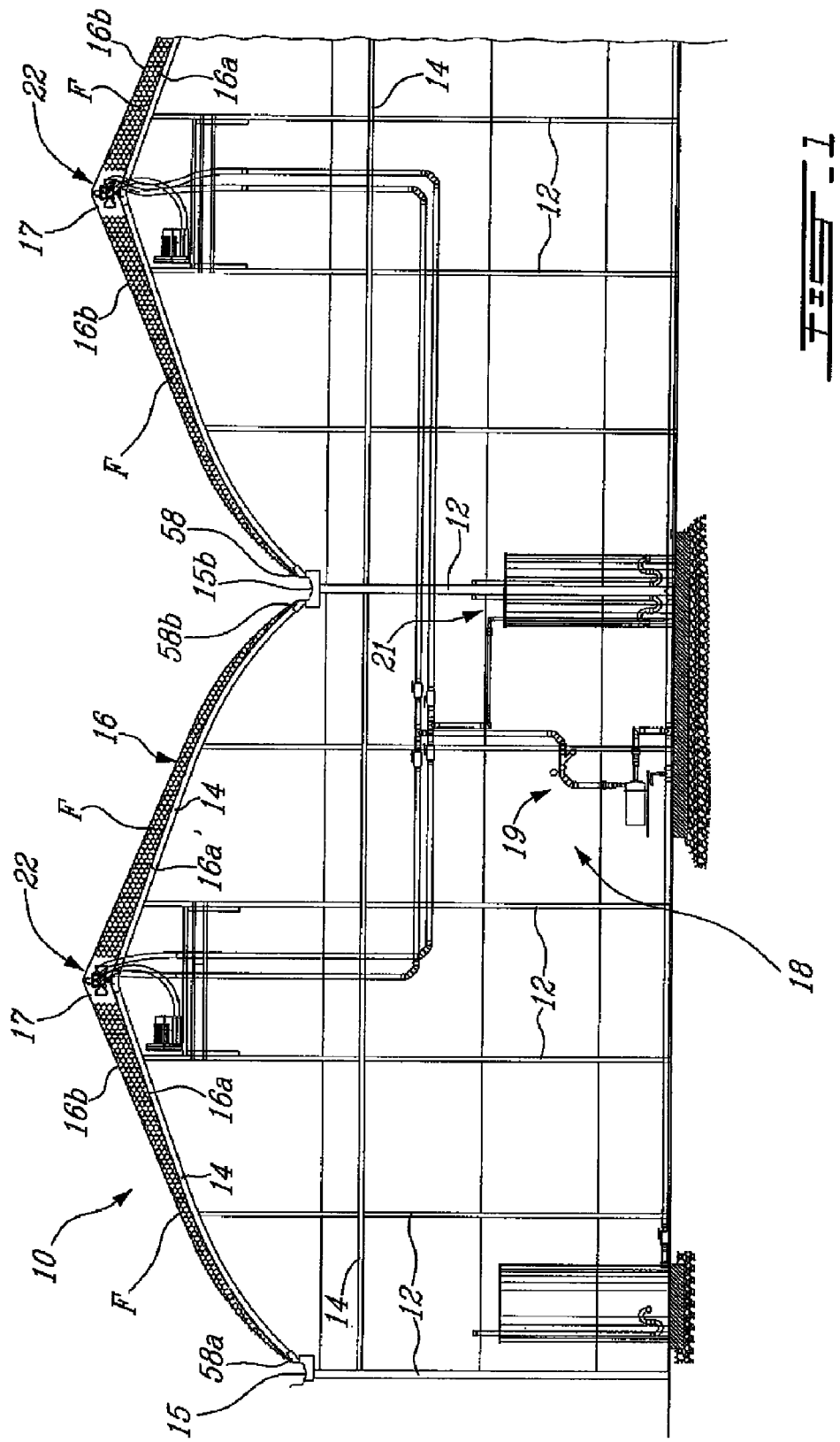
FIG. 1 is a front cross-sectional view of a greenhouse having a foam distribution system for periodically insulating and/or shielding the shell of the greenhouse.

Now referring to FIG. 1, there is shown a greenhouse 10, as an example of a typical structure, having a conventional skeleton framework including among others a number of vertical supporting columns 12 and transversal trusses 14. The greenhouse 10 has a double-walled roof structure 16 comprising inner and outer membranes 16a and 16b stretched over the skeleton framework of the greenhouse 10. Longitudinal gutters 15 are provided at the lower end of each sloping roof sections to channel and carry off rainwater flowing over the outer membranes 16b.

The inner and outer membranes 16a and 16b are typically made of polyethylene sheet or other flexible sheeting materials such as polycarbonate, glass or other forms of plastic to form the skin of the structure. Each set of inner and outer membranes 16a and 16b defines therebetween a roof cavity 17. A foam distribution system 18 is provided for periodically filling the roof cavities 17 with degradable foam F. The foam distribution system 18 can be similar to the one described in Applicant's PCT application PCT/CA2004/001083 or PCT/CA2005/000360. The content of these applications is herein incorporated by reference. However, it is understood that the foam distribution system 18 is not material to the present invention. The foam distribution system 18 generally comprises two independent, automatically controlled, air and foaming solution supply systems 19 and 21 feeding longitudinal foam distribution lines 22 mounted directly in the roof cavities 17 at the crest thereof. The foaming solution is composed essentially of surfactant and water. For instance, a concentrated solution derived from a hydrolyzed protein concentrate base, such as used in the fire fighting foam art could be used. Although the preferred liquid is water, it is understood that other liquids compatible with the surfactant could be used as well.

Figure 2:
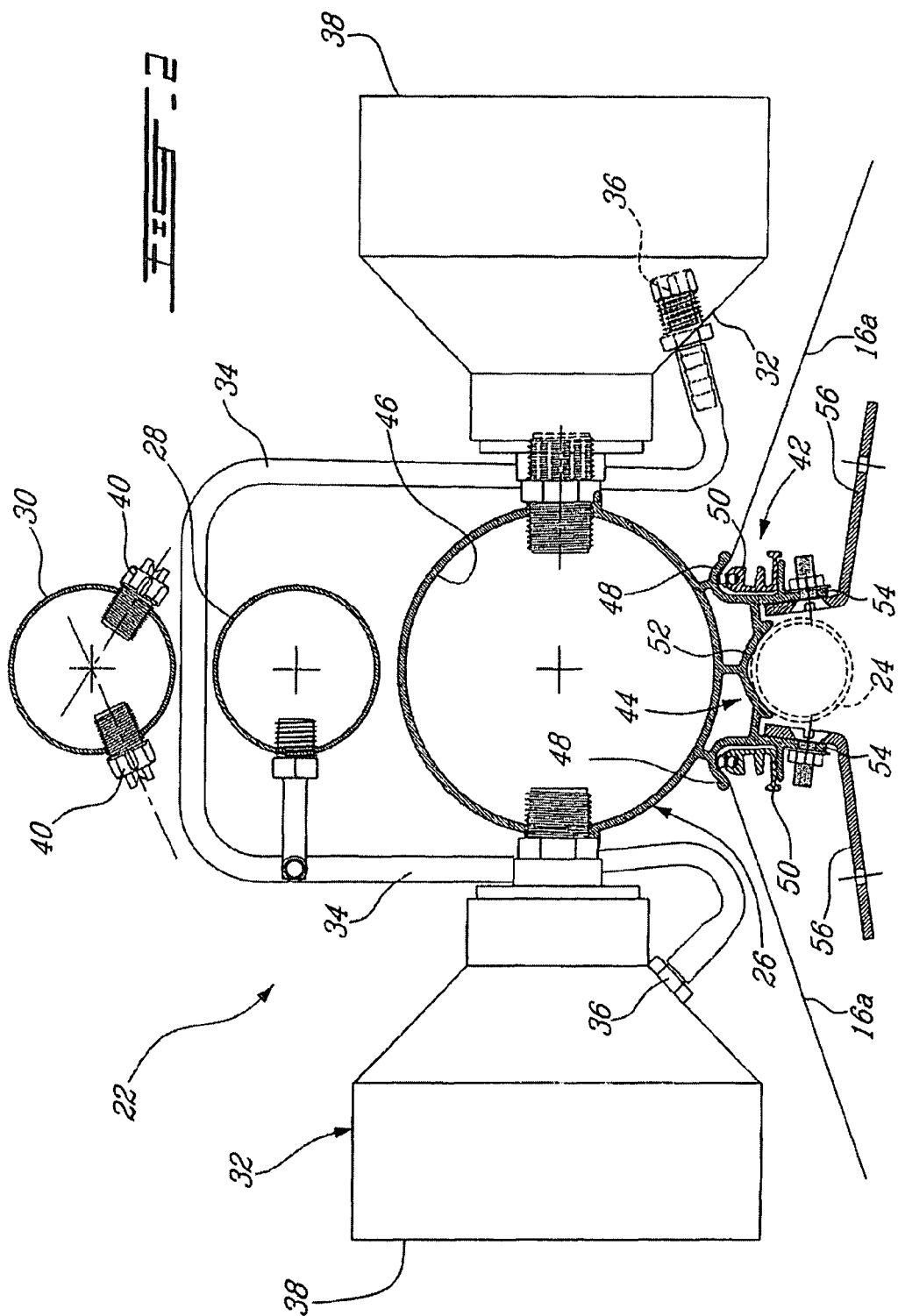
FIG. 2 is a cross-sectional view of one of the distribution lines of the foam distribution system, the distribution line including a 3-pipe assembly and a plurality of foam generators mounted to an extruded air pipe provided with integral membrane fastening members and pipe attachment in accordance with an embodiment of the present invention.

As shown in FIG. 2, each foam distribution line 22 is mounted on a tubular member 24 forming part of the framework of the greenhouse 10 and extending on top of the trusses 14 from a front end to a rear end of the greenhouse 10. Each foam distribution line 22 can, for instance comprises a 3-pipe assembly including an air pipe 26, a liquid soap or surfactant pipe 28 and a water pipe 30. Two sets of longitudinally spaced-apart foam generators 32 are mounted on opposed sides of the air pipe 26. Each foam generator 32 is connected in fluid flow communication with the air pipe 26 via a central air passage thereof. The foaming solution is fed from the surfactant pipe 28 into each foam generator 32 via appropriate tubing 34 and nozzles 36. The nozzle(s) 36 of each foam generator is/are angularly disposed to spray the surfactant solution onto the entire surface of a screen 38 mounted at the distal end of the foam generator 32. As the air fed into the generator 32 flows through the wet screen 38, foam is generated. In this way, the roof cavities 17 can be selectively and independently filled with foam F. Over time, the foam F will collapse, thereby leaving the roof cavities empty. If desired, a vacuum system could also be used to remove the foam F from the roof cavities 17.

After several foam generation and degradation cycles, it might be necessary to wash the inner face of the membranes 16a and 16b in order to wash out any soap or surfactant residues that could otherwise impede the sun rays to pass through the roof of the greenhouse 10. Accordingly, the water pipe 30 is connected in fluid flow communication with a source of water (not shown) and sprinklers 40 are distributed along the length of the water pipe 30 to spray clean water onto the inner face of the inner and outer membranes 16a and 16b.

As can be appreciated from FIG. 2, the air pipe 26 can be provided in the form of an extrusion having an integral double sheet fastening structure 42 and an integral pipe mounting structure 44. More particularly, the air pipe 26 has a cylindrical wall 46 defining a longitudinal passage for feeding the air to the foam generators 32 distributed along the roof cavities. The integral sheet fastening structure 42 comprises a pair of channels 48 extending longitudinally on an outer surface of the cylindrical wall 46. The channels 48 are symmetrically disposed relative to a central axis of the cylindrical wall 46, the open side of the channels 48 facing away from that axis of symmetry. Each channel 48 is configured to receive a keeper, a mating wedge or sheet retaining insert 50 in locking engagement therein in order to fixedly hold an end portion of one of the inner membranes 16a. According to another non-illustrated embodiment, the double sheet fastening structure 42 and the integral pipe mounting structure 44 are extruded together as a single part separate from the air pipe 26. The sheet fastening structure 42 and the pipe mounting structure 44 and are then bolted to the air pipe to form an air pipe/sheet fastening assembly adapted to be mounted as a unitary part to tubular member 24. Accordingly, the air pipe 26 can be used to secure two adjacent inner membranes 16a to the framework of the greenhouse 10, as depicted in FIG. 2. The air pipe 26 has thus a dual function. It acts as an air duct and as a sheet fastening structure. The inner membranes 16a are anchored to the air pipe 26 by positioning respective end portions thereof in the channels 48 and by then inserting the sheet retaining inserts 50 in the channels 48 in locking engagement therein so as to securely wedge the end portions of the inner membranes 16a between the inner surface of the channels 48 and the inserts 50. It is understood that the channels 48 and mating wedge or sheet retaining inserts 50 could have various configurations. For instance, U.S. Pat. No. 5,009,540 discloses one possible configuration. The configuration of other commercially available film locking devices could also be embodied in the air pipe extrusion.

The integral pipe mounting structure 44 includes a saddle 52 extending between the channels 48. The saddle 44 is seated on top of the greenhouse framework tubular member 24 and is configured to generally follow the curvature thereof. The mounting structure 44 further includes a pair of mounting legs or flanges 54 depending from the underside of the channels 48. Longitudinally spaced-apart holes are defined along the length of the mounting flanges 54 for allowing the air pipe extrusion to be bolted to brackets 56 which are in turn adapted to be secured to the framework of the greenhouse using self-tapping screws (not shown) or the like.

Figure 3:
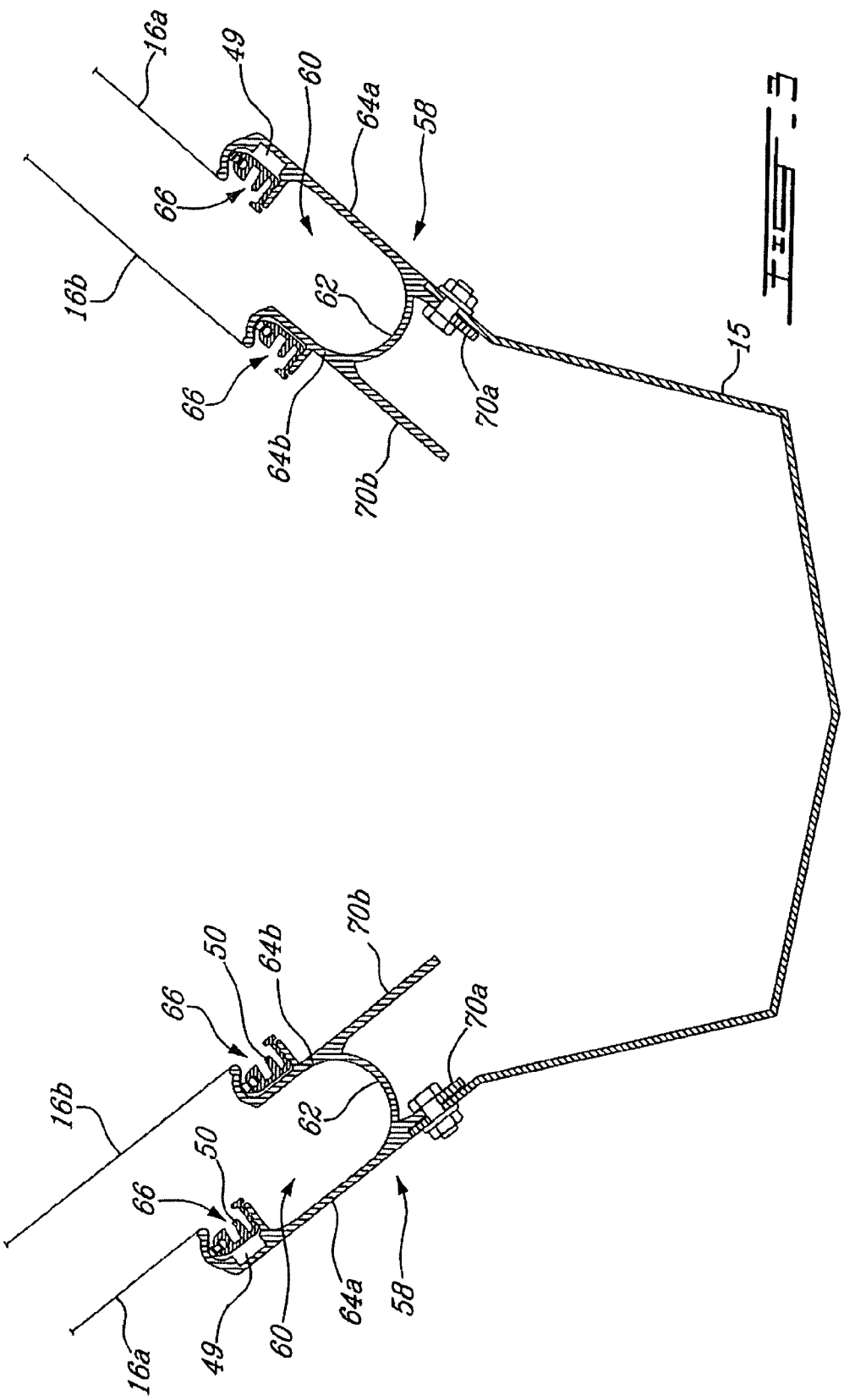
FIG. 3 is a cross-sectional view of a gutter assembly with double membrane fastening devices in accordance with an embodiment of the present invention.

As best seen in FIG. 3, the lower end portions of the inner and outer membranes 16a and 16b are attached to the greenhouse framework via a longitudinally extending gutter 58 interposed between each pair of inner and outer membranes 16a and 16b for collecting and channeling the liquid resulting from the foam degradation as well as the water sprayed on the inner face of the membranes by nozzles 40. Therefore, the bottom ends the roof cavities 17 are formed by distinct gutter pieces. Each gutter 58 is preferably extruded in the form of an elongated channel 60 having an arcuate bottom 62 and a pair of side walls 64a, 64b. A sheet locking channel 66 is formed at the distal end of each side wall 64a, 64b for receiving a sheet retaining insert 50 in order to fixedly hold the lower ends of the membranes 16a, 16b, as described hereinbefore with respect to the air pipe 26. The inner membrane 16a is retained captive in channel 66 of wall 64a and the outer membrane 16b is retained captive in channel 66 of wall 64b. The locking channels 66 generally have the same configuration as the channels 48. A recess 49 can be provided in the channels 66 to receive the heads of fasteners, such as bolts or screws, for mounting the roof cavity gutter 58 to an adjacent framework structure. However, in the illustrated examples, the roof cavity gutters 58 are bolted to the greenhouse gutters 15 via a mounting leg 70a extending from an underside of the bottom 62 of the gutters 58. A second leg 70b extends from the underside of the gutter bottom 62 as an extension of the gutter side wall 64 facing the first leg 70a. In some alternative mounting arrangements for greenhouses having openable roof sections, the second leg 70b is adapted to rest on an underlying greenhouse framework member to prevent water infiltration when the roof section is pivoted to a closed position thereof.

FIG. 4 illustrates another embodiment of a roof cavity gutter 58' specifically designed for openable roof sections. According to this variant, the gutter 58' is not mounted to a greenhouse gutter 15, but rather to the framework structure 75 of a roof section adapted to be pivoted between an open position in which the skeleton structure 75 is held at a distance away from gutter 15 and a closed position in which the skeleton structure 75 rests on the gutter 15. The gutter 58' shown in FIG. 4 differs from the gutter 58 shown in FIG. 3 in that the mounting structure thereof includes a back channel 76 configured to receive the lower end of the arms of the roof skeleton structure 75. The back channel 76 has a square cross-section defined by a straight bottom wall 72, a short leg 70c and an opposed long leg formed by wall 64a' of channel 60' and mounting leg 70a'. A reinforcing web 74 extends between the lower ends of legs 70a' and 70b'. A number of longitudinally spaced-apart bolts 78 extend through legs 70a, 70b, 70c and the arm of the framework structure 75 for securing the gutter 58' to the openable roof section. Screws 80 are also used to fix the gutter 58' to the framework of the openable roof section. The end of the screws 80 is received in the sheet receiving channel 66' of the back wall 64a' of channel 60'.

Referring back to FIG. 1, we will now describe the installation procedure of the inner and outer membranes 16a and 16b for one greenhouse section. A first inner membrane 16a is anchored at a first lower end thereof to a first roof cavity gutter 58a and at a second upper end thereof to the air pipe 26 of foam distribution line 22. A second membrane 16a' is then anchored at a first upper end thereof to the air pipe 26 and at a second lower end thereof to a second roof cavity gutter 58b. Thereafter, the outer membrane 16b is anchored at a first lower end thereof to the first roof cavity gutter 58a and at a second lower end thereof to the second roof cavity gutter 58b. The outer membrane 16b is supported at midway between the opposed ends thereof by the central foam distribution line 22. By so using foam distribution parts (i.e. the air pipe 26 and the gutters 58) to fix the membranes 16a and 16b to the greenhouse framework, the number of pieces required to complete the installation can be minimized.

The above description is meant to be exemplary only, and one skilled in the art will recognize that changes may be made to the embodiments described without department from the scope of the invention disclosed. Any modifications which fall within the scope of the present invention will be apparent to those skilled in the art, in light of a review of this disclosure, and such modifications are intended to fall within the appended claims.

What is claimed is:

1. A periodically shieldable solar structure comprising an inner membrane and an outer membrane defining therebetween an internal cavity, a foam generating system for selectively filling said internal cavity with degradable foam, said inner and outer membranes being united along a lower end thereof by a first gutter interposed between the inner and outer membranes and defining a top open-ended channel for receiving and channeling the liquid resulting from foam degradation, the first gutter having a mounting flange mounted to a second gutter provided at a lower end of a slope defined by the outer membrane for collecting and carrying off rain water flowing over the outer membrane, the first gutter further having first and second side walls provided with respective sheet holding means for respectively fixedly anchoring said inner and outer membranes to said first and second side walls of said gutter, said first and second side walls having an inner face forming part of a boundary wall of the channel receiving the liquid resulting from foam degradation, the sheet holding means of the first side wall being provided on said inner face, the sheet holding means of the second side wall being provided in an outer face thereof opposite to said inner face.

2. The periodically shieldable solar structure defined in claim 1, wherein the first and second opposed side walls each terminate into a female locking part adapted to receive a separate mating insert, the inner and outer membranes being captively retained between the female locking part and the corresponding mating insert.

3. A fastening device for fixing first and second membranes to a framework, comprising a main member adapted to be mounted to the framework, said main member having first and second arms interconnected by a bottom web, said bottom web and said first and second arms forming a gutter, said first and second arms being respectively provided with first and second sheet keeper receiving channels at respective distal end portions thereof relative to said bottom web, said first and second arms having opposed inner facing surfaces, said first and second sheet keeper receiving channels being adapted to respectively receive first and second sheet keepers in locking engagement therewithin in order to respectively fixedly hold one end of the first and second membranes in said first and second sheet keeper receiving channels such that the gutter extends between the membranes the first sheet keeper receiving channel being defined in the inner facing surface of the first arm, whereas the second sheet keeper receiving channel being defined in an outer facing surface of the second arm opposite said inner facing surface thereof.

* * * * *